United States Patent [19]

Bogaert et al.

[11] Patent Number: 6,139,751
[45] Date of Patent: Oct. 31, 2000

[54] BIODEGRADABLE COMPLEXING AGENTS FOR HEAVY METALS

[75] Inventors: Piet Marc Paul Bogaert, Ede; Theodoor Maximiliaan Slaghek, Rotterdam; Henricus Wilhelmus Carolina Raaijmakers, Roosendaal, all of Netherlands

[73] Assignee: Cooperatie Cosun U.A., Roosendaal, Netherlands

[21] Appl. No.: 09/214,867

[22] PCT Filed: Jul. 14, 1997

[86] PCT No.: PCT/NL97/00409

§ 371 Date: Jan. 14, 1999

§ 102(e) Date: Jan. 14, 1999

[87] PCT Pub. No.: WO98/06756

PCT Pub. Date: Feb. 19, 1998

[30] Foreign Application Priority Data

Aug. 9, 1996 [NL] Netherlands ............ 1003776

[51] Int. Cl.$^7$ ...................................... C02F 1/62
[52] U.S. Cl. ............... 210/679; 210/688; 210/730; 210/912; 405/128; 536/121; 536/122; 536/123.1
[58] Field of Search ................. 210/679, 681, 210/688, 730, 912; 405/128; 536/121, 122, 123.1

[56] References Cited

U.S. PATENT DOCUMENTS

| | | | |
|---|---|---|---|
| 2,697,093 | 12/1954 | Jones | 260/215 |
| 4,385,046 | 5/1983 | Milbrath et al. | 536/21 |
| 4,908,137 | 3/1990 | Chen et al. | 210/679 |
| 4,985,233 | 1/1991 | Klavenes et al. | 436/173 |
| 4,986,980 | 1/1991 | Jacobsen | 424/9 |
| 5,208,324 | 5/1993 | Klaveness et al. | 534/16 |
| 5,326,864 | 7/1994 | Besemer et al. | 536/123.1 |
| 5,370,798 | 12/1994 | Uchiyama et al. | 210/681 |
| 5,907,037 | 5/1999 | Gujral et al. | 536/59 |

OTHER PUBLICATIONS

L. Maekawa et al., "Uber die Oxydation des Insulins with Perjodate", XP002029054, J. of Agr. Chem. Soc. Japan, vol. 28, 1954, pp. 357–363.

*Primary Examiner*—Peter A. Hruskoci
*Attorney, Agent, or Firm*—Young & Thompson

[57] ABSTRACT

Heavy metals can be effectively complexed with a derivative of a fructan, which derivative contains complexing groups chosen from —X—CY—ZM, —X—CY—ZM, —X—CY—S—S—CY—X—Q, —PY'(—Z'M)$_2$, —SO$_3$M and —NR—CH$_2$—COOM, where M is a metal or hydrogen, Q denotes the residue of an alcohol or polyol, R is hydrogen or carboxymethyl and X, Y, Y', Z and Z', independently of one another, are O, S or NH and at least one of X, Y and Z is S, with a degree of substitution of 0.1–2.5. The complexing groups are in particular xanthate, xanthide or dithiocarbamate groups.

13 Claims, No Drawings

BIODEGRADABLE COMPLEXING AGENTS FOR HEAVY METALS

The invention relates to environmentally friendly complex-forming agents for heavy metals, which agents are based on carbohydrates.

Heavy metals are a major environmental problem. Many heavy metals, such as copper, zinc, cadmium and the like, occur in particular in sludge and manure (pigs). The concentration of heavy metal ions in these materials often exceed the limits set by legislation, for reuse as fertiliser or building soil. Consequently these materials have to be treated as waste materials and burned in incinerators or dumped under special conditions in large depots at considerable cost. Thus there is a need for processes which remove heavy metals from these materials in such a way that reuse is possible.

One way of removing heavy metals is a treatment with compounds which are capable of complexing heavy metal ions from aqueous solutions. Far and away the most important complexing agent is EDTA (ethylenediaminetetraacetic acid). The sequestering capacity (SC), which is expressed as the number of mmol metal bound per gram of complexing agent, is a measure of the complexing power, The SC value of EDTA for cadmium is 4.1. EDTA displays a broad preference for (heavy) metal ions.

The disadvantage of this broad preference is that calcium in particular is captured, as a result of which a large amount of EDTA is needed to be able to complex other, and less environmentally friendly, metal ions in addition to calcium. A second disadvantage of EDTA is that this compound is not biodegradable, as a result of which accumulation of EDTA takes place in water treatment plants. This accumulation has adverse consequences for the effectiveness of the water treatment. A third disadvantage of EDTA is that a flocculating agent is always needed to precipitate the complex of EDTA with the metal ion, so that the contamination can be effectively separated off from the liquid phase.

Consequently, there is a need for new complexing agents which do not have these disadvantages. In the past a great deal of research was carried out on starch derivatives, xanthates (the salts/esters of dithiocarbonic acid) coming to the fore as being suitable (see, for example, U.S. Pat. No. 4,238,329, U.S. Pat. No. 4,083,783, U.S. Pat. No. 4,051,316 and U.S. Pat. No. 3,947,354). The SC value of these starch derivatives is about 0.8 for cadmium. The principle of the use of starch xanthates is to remove the heavy metal ions from aqueous solutions by immobilisation of these ions in an insoluble (cross-linked) starch-xanthate matrix.

It has now been found that complexing derivatives can be prepared from fructans, including inulin, which derivatives are found to have a high complexing capacity for heavy metals, and which are capable of selectively extracting heavy metals from insoluble mixtures containing them.

The process and derivatives according to the invention are defined in the appending claims. The derivatives preferably have a degree of substitution (that is to say a content of complexing groups per monosaccharide unit) (DS) of 0.1–2.5, in particular of 0.2–1.5.

Fructans are understood to comprise all oligo- and polysaccharides which have a majority of anhydrofructose units. The fructans can have a polydisperse chain length distribution and can be straight-chain or branched. They may be linked by β-2,1 bonds as in inulin or by β-2,6 bonds as in levan. The fructans comprise both products obtained directly from a vegetable or other source and products in which the average chain length has been modified (increased or reduced) by fractionation, enzymatic synthesis or hydrolysis. The fructans have an average chain length (=degree of polymerisation, DP) of at least 3, rising to about 1000. Preferably, the average chain length is 3–40, in particular 5–30 monosaccharide units. In particular, the fructan is inulin (β-2,1-fructan) or a modified inulin.

Modified fructans which according to the invention can be converted to complexing derivatives are, for example, hydrolysis products, that is to say fructan derivatives having a shortened chain, and fractionated products having a modified chain length. Reduced, oxidised and hydroxyalkylated fructans can also be used.

A particular modified inulin which can suitably be converted to a complexing derivative is a reduced dialdehyde-inulin. Dialdehyde-inulin can be obtained in a known manner by oxidation of inulin, for example with periodic acid. When this dialdehyde-inulin is reduced, for example with hydrogen in the presence of a transition metal (Pt/C) or with sodium borohydride, a polyol is produced which contains a large number of primary hydroxyl groups. Said polyols can be converted to derivatives which likewise have a very good complexing action.

The derivatives can contain complexing groups such as $-NH-CH_2-COOM$, $-N(-CH_2-COOM)_2$, $-OSO_3M$, $-NHSO_3M$, $-OCS_2M$, $-OCSS-SCSO-Q$, $-OCOSM$, $-NHCS_2M$, $-OP(O)(OM)_2$, $-OP(S)(OM)_2$, $-NHP(S)(NH_2)_2$ etc. Derivatives containing combinations of such groups are equally suitable. Said groups can be bound directly to a carbon atom of the fructan residue or via one or more bridging groups such as alkyleneoxy (e.g. ethyleneoxy, $-CH_2CH_2O-$, 1,2-propyleneoxy, 2-hydroxy-1,3-propyleneoxy), alkyleneimino (e.g. ethyleneimino $-CH_2CH_2NH-$, 2-hydroxy-1,3-propyleneimino, 1,4-butyleneimino), (thio)carbonylaminio, etc. The bridging groups (spacers) can be introduced by reaction of the fructan with epoxides or aziridines or β- or ω-haloalkyl ethers and amines. When the linking atom between the complexing group and the fructan residue is an oxygen atom, the derivatives can be obtained by esterification of the fructan or the polyol-fructan with, for example, $SO_3$, chlorosulphonic acid, chlorophosphoric acid, thiophosphoyrl, chloride, or $CS_2$ in the presence of a base. When the linking atom is a nitrogen atom, the derivatives can be obtained by addition of the same treagents to the amino-alkyl extended fructans. Nitrogen-linked derivatives can also be obtained using, as starting materials, a fructan containing aldehyde groups and an amine, preferably a polyamine, such as ethylenediaminie, diethylenetriaminie, thiourea, hydrazine, etc., optionally followed by reduction of the imine, after which reaction with haloacetic acid, $CS_2$ and the like leads to the desired complexing derivative. The sulphonic and (thio)phosphonic acid groups can also be bound to the fructan residue through a carbon atom. For example, the $SO_3M$ or $PO_3M_2$ group can be introduced by addition of sulphite or phosphite to an aldehyde functional group, resulting in a group $-CH(OH)SO_3M$ or $-CH(OH)PO_3M_2$. These groups can also be introduced by addition of maleic anhydride to the fructan, followed by addition of sulphite or (thio)phosphite, resulting in a group $-O-CO-CH_2-CH(COOH)SO_3M$ or $-O-CO-CH(CH_2-COOH)SO_3M$ and the corresponding phosponates. Other modes of introducing sulpho groups include reaction with hydroxymethylsulphonic acid (resulting in a group $-O-CH_2-SO_3M$) or with β-chloroethylsulphonic acid (resulting in a group $-O-CH_2CH_2-SO_3M$). Phospho and thiophospho groups can e.g. be introduced by reaction of a halomethylphosphonic acid with the formation of an N- or O-phosphonomethyl derivative.

The complexing derivatives according to the invention are preferably xanthates, that is to say compounds containing the —$OCS_2M$ group, where M is a metal atom, such as sodium, potassium or magnesium, or a hydrogen atom. The xanthates can be stabilised by reaction with magnesium ions (M=Mg). The complexes may advantageously also be dithiocarbamates having the formula —NH—$CS_2M$, or xanthides having the formula —O—CS—S—S—CS—O—Q, wherein Q may be the residue of an alcohol or a polyol. Examples of such alcohols and polyols are simple alcohols like ethanol and isopropanol, polyols such as glycol, glycerol, glucitol and other alditols, monosaccharides such as glucose and fructose, disaccharides such as sucrose and lactose and, especially oligo- and polysaccharides such as fructans including inulin. The xanthides were found to be more stable than the corresponding xanthates while largely maintaining their complexing power. The xanthates can be prepared in a manner known per se. The fructan or modified fructan can, for example, be dissolved in water and treated in the presence of a base with carbon disulphide ($CS_2$). The reactants should be well mixed e.g. by vigorous stirring and/or by the use of a phase transfer catalyst. Preferaoly a high fructan content is maintained in the reaction mixture (e.g. >10 wt. %). The xanthides max obtained by oxidation of the fructan xanthate or mixed xanthates with oxygen, hydrogen peroxide, hypochlorite, nitrite, iodine, and the line. The complexants can be used directly. For storage, they may be dried by spray-drying or other technique.

The complexing fructan derivatives according to the invention do not only have a good complexing action with heavy metals, they also have a strong preference for a heavy metal such as cadmium, copper, and lead, over, for example, calcium. They also allow recovering of the metals from the complexes for further disposal and reuse of the complexants.

The results of the complexing power of xanthates of inulin and a few other carbohydrates are summarised in Table 1 below. It can be seen from this table that the inulin derivatives score better than the other carbohydrates.

The invention relates also to the novel complexing derivatives described above. The invention furthermore relates to a method for the preparation of complexing substances as described above.

The process of the invention relating to the use of the complexing derivatives described above comprises selectively removing heavy metals from a mixture, the mixture being treated with the complexing derivative. The mixture can be, in particular, a slurry or suspension in water, a sediment or other type of deposit on a water bed, peat bed or marsh bed, a type of soil such as clay and sand or a mixture of two or more of the above-mentioned materials. According to said method, the mixture is brought into contact with an adequate amount of the complexing derivative, for example in dissolved form, in order to capture the heavy metals completely or virtually completely, after which the complexed derivative is separated off from the mixture and processed in a manner known per se.

TABLE 1

| Carbohydrate | Av. DP | % S | Av. DS | $Cd^{2+}$ mmol/g | $Ca^{2+}$ mmol/g |
|---|---|---|---|---|---|
| Sucrose | 2 | 5.3 | 0.15 | 0.34 | 0.06 |
| Inulin | 7–10 | 10.9 | 0.32 | 1.30 | 0.08 |
| Inulin | 16 | 9.2 | 0.26 | 1.40 | 0.06 |
| Maltodextrin 10 | 10 | 7.3 | 0.20 | 0.45 | 0.12 |

EXAMPLES

General

Cadmium-Complexing Measurements

The cadmium-biniding power (SC) is determined by measuring the concentration of non-bound $Cd^{2+}$ using an ion-selective electrode and a 363-S7/120 reference electrode (Ingold), the following procedure being followed. A known amount of the product to be tested is added to 50 ml of a stirred solution of 0.1 M $NaClO_4$ and $10^{-3}M$ $Cd(NO_3)_2$ in demineralised water. The pH is adjusted to 6 with acetic acid. The amount of product needed to reduce the concentration of non-bound $Cd^{2+}$ to $10^{-5}M$ is determined from the titration curve by interpolation. The ion-selective electrode is calibrated with the aid of $10^{-2}$, $10^{-3}$, $10^{-4}$, $10^{-5}$ and $10^{-6}M$ $Cd(NO_3)_2$ and 0.1 M $NaClO_4$ solutions. The SC value is defined as the amount of $Cd^{2+}$ in mmol which is bound by 1 gram product obtained.

Example 1

Preparatioii of Xanthates on the Basis of Inulin of DP 16

4 g (100 mmol) sodium hydroxide are added to 16.2 g (100 mmol) Frutafit®, dissolved in 146 ml demineralised water. To achieve deprotonation of the free hydroxyl groups, the reaction mixture is stirred for 1 hour at room temperature. 1.0 equivalent 7.6 g (100 mmol) carbon disulphide ($CS_2$) is then added to the mixture. Since $CS_2$ is not soluble in an (alkaline) aqueous medium, two liquid layers are produced on adding $CS_2$. The two-phase system is then stirred vigorously for 12 hours; a reflux condenser ensures that the $CS_2$ does not volatilise during the reaction. After 12 hours 0.5 equivalent (50 mmol) $MgSO_4$ is added to the mixture as stabiliser for the xanthates formed. During complexation of the xanthates with the $Mg^{2+}$ ions a precipitate originating from $Mg(OH)_2$ can form. After filtering the mixture, the filtrate is extracted three times with 50 ml dichloromethane and the aqueous phase is saturated with 580 ml ethanol. The xanthates, which are insoluble in ethanol, precipitate out from the solution and can be recovered after filtering off. In order to remove all salts from the product, the xanthates are re-dissolved in water, precipitated with ethanol, dissolved in water and. freeze-dried (yield 95%).

Example 2

Dialdehyde-Inulin (DAI) Having a Degree of Oxidation of 100%

65.35 g sodium metaperiodate are added to 45.0 g (227 mmol) precipitated inulin dissolved in 900 ml water. The pH of the solution is maintained at 6.2 by adding $Na_2CO_3$. When the pH of the solution no longer changes, 4 litres ethanol are added, after which the reaction mixture is left to stand overnight at −20 ° C. During this period the sodium iodate present precipitates out. The reaction mixture is then filtered and the filtrate evaporated, after which the residue is dissolved in water and freeze-dried. The yield of DAI is 41.5 g, 93%. The $^{13}C$ NMR spectrum (ref. tBuOH) of dialdehyde-inulin having a degree of oxidation of 100% is sunmmarised in Table 2.

Reduction of DAI-100% With Sodium Borohydride 7.6 g (200 mmol) sodium borohydride are added to 16.0 g (100 mmol) DAI-100 %, dissolved in 144 ml water. The reaction mixture is stirred for 4 hours at room temperature. After all aldehyde groups have been converted to the corresponding alcohol functional groups, the mixture is acidified to pH 5 by adding 2N HCl in demineralised water. The reaction mixture is then evaporated and the residue dissolved in a water/methanol mixture (1/1). These latter steps are needed to remove the boron complexes formed during the reaction as methyl esters of boric acid. For further purification, use is made of gel permeation chromatography. A number of regions can be differentiated in the chromatogram, which regions are collected as fractions. Fractions 1 and 2 contain long-chain reduced DAI-100%, the average chain length of fraction 1 being greater than that of fraction 2. Fractions 3 and 4 contain mainly shorter chains. The fractions are then analysed by means of a Dionex analysis.

The $^{13}C$ NMR spectrum of the polyol obtained by reduction of DAI is summarised in Table 2. The signal at 63.76 ppm is the $CH_2$ signal belonging to C-4 and C-6 and the signal at 59.24 ppm can, as in the case of DAI-100%, be assigned to the $CH_2$ group (C-1).

TABLE 2

$^{13}C$ NMR spectra of DAI-100%, reduced DAI-100% and xanthated reduced DAI-100%

| Number | DAI-100% | Polyol | Xanthate |
|---|---|---|---|
| C-1/C-6 | 60.23/58.96 | 59.24/63.36 | 58.1/63.4 |
| C-2 | 98.57 | 103.45 | 103.1 |
| C-3 | 90.46 | 61.17 | 61.2 |
| C-4 | 90.46 | 63.36 | 63.5 |
| C-5 | 71.48 | 72.84 | 71.5 |
| $OCS_2$ | — | — | 233.5 |

Synthesis of Xanthates Based on Reduced Dialdehyde-inulin

For the xanthates synthesised on the basis of reduced DAI, the procedure according to Example 1 is followed except that in this case 16 g of the reduced DAI-100 %, 2 equivalents NaOH and $CS_2$ are used. Because the xanthate which is formed after reaction is soluble in ethanol, the reaction mixture is purified by means of gel permeation chromatography. Four fractions are collected, which differ in chain length and in sulphur content. After freeze-drying, the total yield of xanthates is 91% (26, 21, 27 and 17% respectively distributed over the four fractions). The $^{13}C$ NMR data are summarised in Table 2. The complexing results are given in Table 3.

TABLE 3

| Fraction | % S | $Cd^{2+}$ mmol/g | $Ca^{2+}$ mmol/g |
|---|---|---|---|
| 1 | 14.0 | 1.89 | 0.09 |
| 2 | 9.2 | 1.10 | 0.12 |
| 3 | 18.2 | 2.95 | 0.14 |
| 4 | 29.6 | 5.12 | 0.13 |

Example 3
Synthesis of Sulphalted Inulin Derivative 47.7 g (300 mmol) $SO_3$-pyridine are added to 16.2 g (100 mmol) precipitated inulin (DP 5) dissolved in 146 ml dimethylformamide. The reaction mixture is then kept at 60° C. for 6 hours, after which the temperature is raised to 80° C. for 8 hours. The DMF is then removed under a high vacuum, followed by co-evaporation with, successively, water, toluene, ethanol and dichloromethane (3×100 ml in each case). The reaction mixture is then taken up in water (100 mml) and extracted with dichloromethane (3×100 ml). The aqueous phase is then freeze-dried and the yield is 94% based on precipitated inulin. A sulphur determination was carried out on this compound: % S=5.4; complexing power: 0.37 mmol $Cd^{2+}$/g; 0.16 mmol $Ca^{2+}$/g.

Example 4

Example 3 was repeated, except that inulin DP 16 was used. % S =3.5; complexing power 0.24 mml $Cd^{2+}$/g; 0.06 mmol $Ca^{2+}$/g.

Comparative Example

Example 3 was repeated, except that maltodextrin 6 (DP 16) was used: % S=5.4; complexing power 0.17 mmol $Cd^{2+}$/g; 0.07 mmol $Ca^{2+}$/g.

Example 5
Preparatioi of Carboxymethyl-Amino Derivatives

These derivatives were prepared in two ways:

Method a:
3.6, 6.0 and 12 g (60; 100; 200 mmol) diaminoethane respectively are added to 16.0 g (100 mmol) dialdehyde-inulin (degree of oxidation 30, 50 and 100% (sec Example 2)) dissolved in 146 ml demineralised water, after which the reaction mixtures are stirred for 16 hours at room temperature. The imines formed are then reduced with, respectively, 3.8, 6.3 and 12.6 g (60; 100; 200 mmol) sodium cyanoborohydride. After stirring for a further 16 hours at room temperature, the mixture is acidified to pH 6 (2N HCl) and evaporated and the residue is re-dissolved in 146 mml demineralised water. 5, 8 and 16 g NaOH, respectively, and 2 equivalents monochloroacetic acid in the form of the sodium salt (7.0, 11.7 and 23.4 g respectively) are then added to the reaction mixture. After stirring for a further 12 hours at room temperature, the reaction mixture is extracted with dichloromethane (3×100 mml), after which the aqueous phase is further purified by means of GPC. The nitrogen content was determined byd elementary analysis.

30% DAI: %N=4.9; complexing power 0.25 mmol $Cd^{2+}$/g
50% DAl: %N=7.5; complexing power 0.36 mmol $Cd^{2+}$/g
100% DAI: %N=14.3; complexing power 0.41 mmol $Cd^{2+}$/g Method b:
In the second method one equivalent NaOH (5, 8 and 16 g respectively) and one equivalent monochloroacetic acid in the form of the sodium salt (7.0, 11.7 and 23.4 g respectively) are added to, respectively, 3.6, 6.0 and 12 g (60; 100; 200 mmol) diamino-ethane dissolved in 146 ml demineralised water. After stirring for 12 hours at room temperature, 16.0 g (100 mmol) dialdehyde-inulin (having a decree of oxidation of 30, 50 and 100% respectively)) are then added to the reaction mixture. After a further 12 hours at room temperature, the reaction mixture is reduced and purified as described in Method a.

Example 6
Inuline Xanthide

A solution of Frutafit (16.2 g, 100 mmol) and sodium hydroxide (4 g, 100 mmol) in 146 ml of demineralized water was stirred for 1 hour at room temperature. One equivalent of $CS_2$ (7.6 g, 100 mmol) was added and the heterogeneous reaction mixture was stirred vigorously (6–12 h, r.t.). The pH of the reaction mixture was lowered to 11.5 using hydrochloric acid (2N). Hydrogen peroxide (35%, 5 ml, 50 mmol) was added dropwise and the pH was lowered to 4.0, followed by the addition of a second amount of hydrogen peroxide (35%, 5 ml, 50 mmol). During the addition of hydrogen peroxide and pH lowering the temperature was kept below 50° C. The crude reaction mixture was worked up after 30 minutes by concentrating in vacuo and drying in an oven (16 h, 30–50° C.). The yield was 98%.

Example 7
Extraction of Heavy Metals from Sediment Samples

Harbour mud (a sediment from the harbour of Kampen, NL) was air-dried from a dry substance content of 38% to 80%. One g of dried mud (80% d.s.) was added to 100 ml of an aqueous solution of 0.4 g inuline xanthate with pH 7 in 250 ml bottles provided with a screw cap. The mud was maintained in suspension by rotating the bottles on a roller bank for 16 hours at room temperature. The suspensions were then filtered over a 0.45:m (Millipore) filter and the filtrates were analyzed for heavy metals using Atom Absorption Spectroscopy. The results are summarized in table 4.

TABLE 4

Extraction of heavy metals from sediment

| sample | DS | DP | extraction (%) | | |
|---|---|---|---|---|---|
| | | | Cd | Cu | Pb |
| IX-1 | 1.1 | 10 | 63 | 38 | 69 |
| IX-2 | 1.3 | 10 | 45 | 47 | 71 |
| IX-3 | 1.5 | 25 | 80 | 38 | 53 |
| control (water) | | | <1 | <1 | <1 |

What is claimed is:

1. A process for separating heavy metals from a mixture, comprising treating said mixture with a complexing derivative of a fructan, which derivative contains 0.1–2.5 complexing groups selected from the group consisting of xanthate groups, xanthide groups, dithiocarbamate groups and combinations thereof per monosaccharide group of the fructan, and separating the heavy metals from the mixture.

2. The process according to claim 1, wherein the fructan contains β-2,1 bonds.

3. The process according to claim 2, wherein the fructan is inulin.

4. The process according to claim 1, wherein the derivative is derived from a modified fructan selected from the group consisting of oxidized and/or reduced or hydroxyalkylated or amino-alkylated fructans, a fructan hydrolysis product and a fractionated fructan product.

5. The process according to claim 1, wherein the derivative is derived from a reduced dialdehyde-fructan.

6. The process according to claim 1, wherein the fructan derivative contains 0.2–1.5 of said complexing groups per monosaccharide group.

7. The process according to claim 1, wherein the fructan has an average degree of polymerization of 3–50.

8. The process according to claim 1, wherein the mixture is a slurry or suspension in water, a sediment or other type of deposit on a water bed, peat bed or marsh bed, soil, or a mixture of two or more of such materials.

9. A metal-complexing derivative of a fructan, which derivative contains 0.1–2.5 complexing groups selected from the group consisting of xanthate groups, xanthide groups, dithiocarbamate groups and combinations thereof per monosaccharide group of the fructan.

10. A process for the preparation of a derivative of a fructan, which derivative contains 0.1–2.5 complexing xanthate groups per monosaccharide group of the fructan, comprising treating a fructan or modified fructan with carbon disulfide in the presence of a base to form said derivative.

11. A process for the preparation of a derivative of a fructan, which derivative contains 0.1–2.5 complexing xanthide groups per monosaccharide group of the fructan, comprising treating a fructan or modified fructan with carbon disulfide in the presence of a base, and oxidizing the carbon disulfide-treated fructan to form said derivative.

12. A process for the preparation of a derivative of a fructan, which derivative contains 0.1–2.5 complexing groups selected from the group consisting of xanthate groups, xanthide groups, and combinations thereof per monosaccharide group of the fructan, wherein said fructan is modified by a treatment selected from the group consisting of:

addition to the fructan of one or more alkylenoxy groups, and oxidation of the fructan to a dialdehyde-fructan and reduction of dialdehyde-fructan, to produce a polyol, and the polyol is treated with carbon disulfide in the presence of a base.

13. A process for the preparation of a derivative of a fructan, which derivative contains 0.1–2.5 complexing dithiocarbamate groups per monosaccharide group of the fructan, wherein said fructan is modified by a treatment selected from the group consisting of:

addition to the fructan of one or more alkylenei-mino or (thio)carbonylamino groups, and oxidation of the fructan to a dialdehyde-fructan, reaction of the dialdehyde-fructan with an amine and optional reduction of the amine reaction product, to produce a polyamine, and the polyamine is then treated with carbon disulfide in the presence of a base.

* * * * *